US011390286B2

(12) United States Patent
Efrat Sela et al.

(10) Patent No.: US 11,390,286 B2
(45) Date of Patent: Jul. 19, 2022

(54) SYSTEM AND PROCESS FOR END TO END PREDICTION OF LANE DETECTION UNCERTAINTY

(71) Applicant: GM GLOBAL TECHNOLOGY OPERATIONS LLC, Detroit, MI (US)

(72) Inventors: Netalee Efrat Sela, Herzliya (IL); Max Bluvstein, Herzliya (IL); Bat El Shlomo, Hod Hasharon (IL)

(73) Assignee: GM Global Technology Operations LLC, Detroit, MI (US)

( * ) Notice: Subject to any disclaimer, the term of this patent is extended or adjusted under 35 U.S.C. 154(b) by 280 days.

(21) Appl. No.: 16/808,960

(22) Filed: Mar. 4, 2020

(65) Prior Publication Data

US 2021/0276564 A1    Sep. 9, 2021

(51) Int. Cl.
| | |
|---|---|
| *B60W 40/06* | (2012.01) |
| *G08G 1/16* | (2006.01) |
| *G06K 9/62* | (2022.01) |
| *B60W 50/00* | (2006.01) |
| *B60W 60/00* | (2020.01) |
| *G06V 20/56* | (2022.01) |
| *G05D 1/00* | (2006.01) |

(52) U.S. Cl.
CPC ........ *B60W 40/06* (2013.01); *B60W 50/0097* (2013.01); *B60W 60/001* (2020.02); *G06K 9/6256* (2013.01); *G06K 9/6262* (2013.01); *G06V 20/588* (2022.01); *G08G 1/167* (2013.01); *B60W 2420/42* (2013.01); *B60W 2420/52* (2013.01); *B60W 2552/53* (2020.02); *G05D 1/0088* (2013.01); *G05D 2201/0213* (2013.01)

(58) Field of Classification Search
CPC .............. B60W 40/06; B60W 60/001; B60W 50/0097; G06V 20/588; G06K 9/6256; G06K 9/6262; G08G 1/167
See application file for complete search history.

(56) References Cited

U.S. PATENT DOCUMENTS

| | | | | |
|---|---|---|---|---|
| 10,956,788 | B2* | 3/2021 | Jiang | G06N 3/08 |
| 11,256,242 | B2* | 2/2022 | Celia | G06N 3/084 |
| 2016/0019458 | A1* | 1/2016 | Kaufhold | G01S 13/9027 |
| | | | | 706/20 |
| 2017/0061249 | A1* | 3/2017 | Estrada | G06T 5/005 |
| 2017/0287170 | A1* | 10/2017 | Perona | G06V 20/10 |

(Continued)

*Primary Examiner* — Peter D Nolan
*Assistant Examiner* — Wae L Louie
(74) *Attorney, Agent, or Firm* — Quinn IP Law

(57) ABSTRACT

A system for end to end prediction of lane detection uncertainty includes a sensor device of a host vehicle generating data related to a road surface and a navigation controller including a computerized processor operable to monitor an input image from the sensor device, utilize a convolutional neural network to analyze the input image and output a lane prediction and a lane uncertainty prediction, and generate a commanded navigation plot based upon the lane prediction and the lane uncertainty prediction. The convolutional neural network is initially trained using a per point association and error calculation, including associating a selected ground truth lane to a selected set of data points related to a predicted lane and then associating at least one point of the selected ground truth lane to a corresponding data point from the selected set of data points related to the predicted lane.

20 Claims, 6 Drawing Sheets

(56) References Cited

U.S. PATENT DOCUMENTS

| | | | |
|---|---|---|---|
| 2017/0351941 A1* | 12/2017 | Mishra | G06V 10/82 |
| 2018/0001899 A1* | 1/2018 | Shenoy | B60W 40/08 |
| 2018/0096595 A1* | 4/2018 | Janzen | G08G 1/04 |
| 2018/0180733 A1* | 6/2018 | Smits | H04N 13/383 |
| 2019/0012548 A1* | 1/2019 | Levi | G06V 20/56 |
| 2019/0033862 A1* | 1/2019 | Groden | G08G 5/0086 |
| 2019/0147253 A1* | 5/2019 | Bai | G06V 10/454 |
| | | | 382/103 |
| 2019/0147254 A1* | 5/2019 | Bai | G06V 10/82 |
| | | | 382/104 |
| 2021/0276564 A1* | 9/2021 | Efrat Sela | G08G 1/167 |
| 2021/0276574 A1* | 9/2021 | Efrat Sela | B60W 10/04 |

* cited by examiner

US 11,390,286 B2

SYSTEM AND PROCESS FOR END TO END PREDICTION OF LANE DETECTION UNCERTAINTY

INTRODUCTION

The disclosure generally relates to a system and process for end to end prediction of lane detection uncertainty.

Navigation systems and methods for autonomous and semi-autonomous vehicles utilize computerized algorithms to determine a navigational path for the vehicle being controlled. Digital maps and sensor inputs are useful to set the navigational path for the vehicle. Sensor inputs may include image recognition of lane markers and street features. Sensor inputs may further include image, radar, light detection and ranging (LiDAR), or other similar sensor recognition types to monitor locations of other vehicles relative to the vehicle being controlled, for example, to prevent the vehicle being controlled from getting too close to another vehicle in traffic.

Processing sensor readings to detect lane geometries includes image recognition programming. Image recognition programming analyzes shapes and pixelated patterns within images to predict features represented in the images. Image recognition includes errors inherent to the predictions.

SUMMARY

A system for end to end prediction of lane detection uncertainty is provided. The system includes a sensor device for a host vehicle operable upon a road surface within a driving environment including lane markings, wherein the sensor device is operational to generate data related to the road surface within the driving environment. The system further includes a navigation controller including a computerized processor operable to monitor the data including an input image from the sensor device, utilize a convolutional neural network to analyze the input image and output a lane prediction and a lane uncertainty prediction, and generate a commanded navigation plot based upon the lane prediction and the lane uncertainty prediction. The system further includes a vehicle controller operable to control the host vehicle based upon the commanded navigation plot. The convolutional neural network is initially trained using a per point association and error calculation. The per point association and error calculation includes, first, associating a selected ground truth lane to a selected set of data points related to a predicted lane and, second, associating at least one point of the selected ground truth lane to a corresponding data point from the selected set of data points related to the predicted lane.

In some embodiments, the convolutional neural network includes a trained tiles prediction deep network operable to perform image recognition upon the input image and an error prediction head network operable to be trained using the per point association and error calculation.

In some embodiments, utilizing the convolutional neural network includes utilizing a trained lane and uncertainty network, wherein the trained lane and uncertainty network includes a combination of the trained tiles prediction deep network and the error prediction head network.

In some embodiments, the per point association and error calculation further includes determining an error related to the at least one point of the selected ground truth lane and the corresponding data point from the selected set of data points related to the predicted lane.

In some embodiments, the convolutional neural network utilizes a tile matrix to analyze the input image. The per point association and error calculation further includes identifying a corresponding tile of the tile matrix for each point of the selected set of data points related to predicted lane and identifying a tile center for each of the identified tiles. Determining the error related to the at least one point of the selected ground truth lane and the corresponding data point from the selected set of data points related to the predicted lane includes determining a difference between the at least one point of the selected ground truth lane and a selected one of the tile centers.

In some embodiments, determining the difference between the at least one point of the selected ground truth lane and the selected one of the tile centers includes identifying the selected one of the tile centers from the tile centers based upon distances of each of the tile centers to the at least one point of the selected ground truth lane.

In some embodiments, the identifying the selected one of the tile centers from the tile centers is further based upon incrementally progressing along the selected ground truth lane and the predicted lane.

In some embodiments, the computerized processor is further operable to selectively localize the host vehicle in relation to a digital map based upon the lane uncertainty prediction.

In some embodiments, the sensor device includes a camera device.

In some embodiments, the sensor device includes a LiDAR device.

According to one alternative embodiment, a system for end to end prediction of lane detection uncertainty within a host vehicle is provided. The system includes the host vehicle. The host vehicle includes a sensor device for a host vehicle operable upon a road surface within a driving environment including lane markings, wherein the sensor device is operational to generate data related to the road surface within the driving environment, wherein the sensor device includes one of a camera device or a LiDAR device. The host vehicle further includes a navigation controller including a computerized processor operable to monitor the data including an input image from the sensor device, utilize a convolutional neural network to analyze the input image and output a lane prediction and a lane uncertainty prediction. The convolutional neural network includes a trained tiles prediction deep network performing image recognition upon the input image and an error prediction head network initially trained using a per point association and error calculation. The per point association and error calculation includes, first, associating a selected ground truth lane to a selected set of data points related to a predicted lane and, second, associating at least one point of the selected ground truth lane to a corresponding data point from the selected set of data points related to the predicted lane. The computerized processor is further operable to generate a commanded navigation plot based upon the lane prediction and the lane uncertainty prediction. The host vehicle further includes a vehicle controller operable to control the host vehicle based upon the commanded navigation plot.

In some embodiments, utilizing the convolutional neural network includes utilizing a trained lane and uncertainty network, wherein the trained lane and uncertainty network includes a combination of the trained tiles prediction deep network and the error prediction head network.

In some embodiments, the per point association and error calculation further includes determining an error related to the at least one point of the selected ground truth lane and the corresponding data point from the selected set of data points related to the predicted lane.

In some embodiments, the convolutional neural network utilizes a tile matrix to analyze the input image. The per point association and error calculation further includes identifying a corresponding tile of the tile matrix for each point of the selected set of data points related to predicted lane and identifying a tile center for each of the identified tiles. Determining the error related to the at least one point of the selected ground truth lane and the corresponding data point from the selected set of data points related to the predicted lane includes determining a difference between the at least one point of the selected ground truth lane and a selected one of the tile centers.

According to one alternative embodiment, a process for end to end prediction of lane detection uncertainty is provided. The process includes, within a computerized processor, initially training a convolutional neural network using a per point association and error calculation, the per point association and error calculation including, first, associating a selected ground truth lane to a selected set of data points related to a predicted lane and, second, associating at least one point of the selected ground truth lane to a corresponding data point from the selected set of data points related to the predicted lane. The process further includes, within the computerized processor, subsequently utilizing the convolutional neural network for operational use in inference of lane geometries. This utilizing includes monitoring data including an input image from a sensor device of a host vehicle generating the data related to a road surface in front of the host vehicle including lane markings, utilizing the convolutional neural network to analyze the input image and output a lane prediction and a lane uncertainty prediction, and generating a commanded navigation plot based upon the lane prediction and the lane uncertainty prediction. The process further includes controlling the host vehicle based upon the commanded navigation plot.

In some embodiments, utilizing the convolutional neural network for the operational use in the inference of the lane geometries further includes selectively localizing the host vehicle in relation to a digital map based upon the lane uncertainty prediction.

In some embodiments, using the per point association and error calculation further includes determining an error related to the at least one point of the selected ground truth lane and the corresponding data point from the selected set of data points related to the predicted lane.

In some embodiments, utilizing the convolutional neural network to analyze the input image includes utilizing a tile matrix to analyze the input image. In some embodiments, using the per point association and error calculation further includes identifying a corresponding tile of the tile matrix for each point of the selected set of data points related to predicted lane and identifying a tile center for each of the identified tiles. In some embodiments, determining the error related to the at least one point of the selected ground truth lane and the corresponding data point from the selected set of data points related to the predicted lane includes determining a difference between the at least one point of the selected ground truth lane and a selected one of the tile centers.

In some embodiments, determining the difference between the at least one point of the selected ground truth lane and the selected one of the tile centers includes identifying the selected one of the tile centers from the tile centers based upon distances of each of the tile centers to the at least one point of the selected ground truth lane.

In some embodiments, identifying the selected one of the tile centers from the tile centers is further based upon incrementally progressing along the selected ground truth lane and the predicted lane.

The above features and advantages and other features and advantages of the present disclosure are readily apparent from the following detailed description of the best modes for carrying out the disclosure when taken in connection with the accompanying drawings.

DETAILED DESCRIPTION

Figure 1:
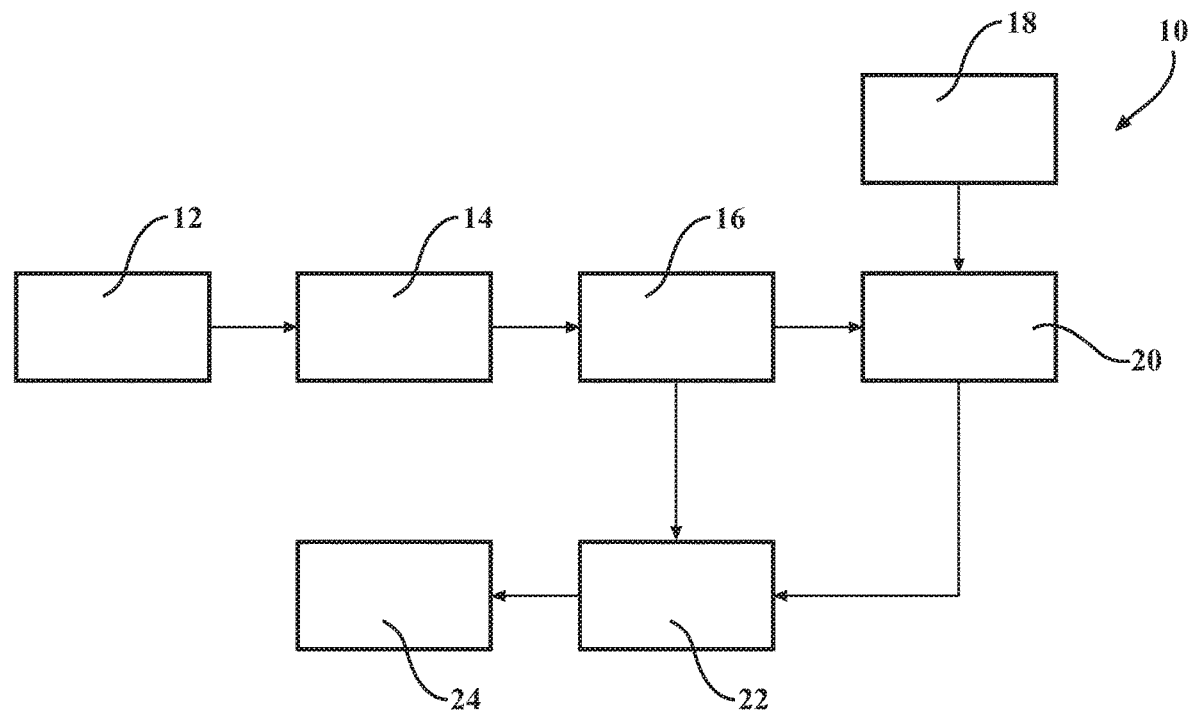
FIG. 1 schematically illustrates an exemplary CNN training information flow, in accordance with the present disclosure.

A process and system for system and process for end to end prediction of lane detection uncertainty is provided. The process may utilize a convolutional neural network (CNN) to process an input image and produce an output analyzing the image. In particular, images regarding lanes of travel upon a road surface in front of, behind, or close to a host vehicle may be analyzed for the purpose of aiding or guiding navigation of the vehicle within a lane or navigating travel between the lanes. The process utilizes efficient calculation of lane pointwise lateral error given a ground truth lane.

CNNs are trained with weights and biases that may be used to improve accuracy of the output. One of the aspects of a CNN that is trained is uncertainty prediction. The disclosed process is a learning-based approach that predicts lane point position uncertainty on the fly without relying on offline hand-crafted error models. Uncertainty prediction in a lane detection process is useful to quantify because it provides a measure of the quality of the lane detection output. If the uncertainty prediction determines that uncertainty is low or that the lane detection output is high quality, the lane detection output may be relied upon for navigating the host vehicle. If the uncertainty prediction determines that uncertainty is high or that the lane detection output is low quality, then a remedial action may be initiated. Such a remedial action may include non-limiting examples of indicating a warning to a driver or employing an alterative or additional process to improve lane detection uncertainty, such as processes to estimate lanes based upon movement of other vehicles in traffic. In another example, uncertainly may be utilized to selective localization of the vehicle in relation to a digital map. With low uncertainty, features of the detected roadway may be utilized to localize or identify upon the digital map precisely where the vehicle presently is located. With high uncertainty, other localizers such as traffic signs may be utilized to achieve or augment accuracy of the localization.

During the training of uncertainty prediction, the process may, given lane point predictions, perform points clustering to form an entire lane. The process additionally may subsequently utilize an association algorithm to match every lane to a ground truth lane. The process additionally may subsequently calculate point associations to give rise to accurate measurements of the lateral distance between every point and the ground truth lane. The process may utilize the lateral errors to supervise the uncertainty prediction.

The process associates predicted lane point clusters to ground truth lanes, considering aggregated information from a plurality of points along the curve. The process maps each predicted point to the curve to which it may be associated. Some methods use the Euclidean distance between the predicted point and a ground truth lane point, which can lead to errors in the measured error due to lane miss-match. The disclosed process may calculate lateral distance between predicted lane points to ground truth lane points which are not necessarily the closest ground truth lane points. In this way, the process allows for predicting lane point uncertainty while considering the entire lane geometry and may account for large errors of the predicted points relative to the ground truth lane. The process may utilize vectorized calculations for faster uncertainty training.

The process achieves interpretable uncertainty prediction per point. In one embodiment, the process includes, given predicted lanes, performing an entire lane association to match each lane to a corresponding ground truth lane. This is followed by per point association which relies on accurate and fast calculations. This enables the estimation of the lateral error and directional error between each predicted point and the associated ground truth lane. This in turn is used to supervise uncertainty prediction for each lane point.

FIG. 1 schematically illustrates an exemplary CNN training information flow 10. CNN training information flow 10 includes sensor 12 operable to gather images related to a road surface. The CNN training information flow 10 illustrates operation of a process whereby a CNN may be trained with predetermined ground truth lanes and input images corresponding to the ground truth lanes. Information from the sensor 12 is provided to a trained tiles prediction deep network 14. The trained tiles prediction deep network 14 includes a neural network operable to receive input images and apply analytic algorithms and trained weights and biases to perform image recognition upon the input images. The trained tiles prediction deep network 14 provides an output of lane tiles predictions 16 or predicted lane geometries based upon the input images. Data regarding the predetermined ground truth lanes 18 is provided, and a per point association and error calculation 20 compares the lane tiles predictions 16 and the predetermined ground truth lanes 18, providing error values as described herein associating points of the lane tile predictions 16 to the predetermined ground truth lanes 18. The error values from the per point association and error calculation 20 are provided to an error prediction head network 22. Input is provided to the error prediction head network 22 as lane tiles predictions 16, and supervision is provided to the error prediction head network 22 as the error values determined by the per point association and error calculation 20. Through the input and supervision, the error prediction head network 22 is trained and a loss against real lane prediction error 24 is optimized.

Throughout the disclosure, input images may be images captured by a camera device, data generated by a LiDAR device, or data collected by some other similar sensor device.

Figure 2:
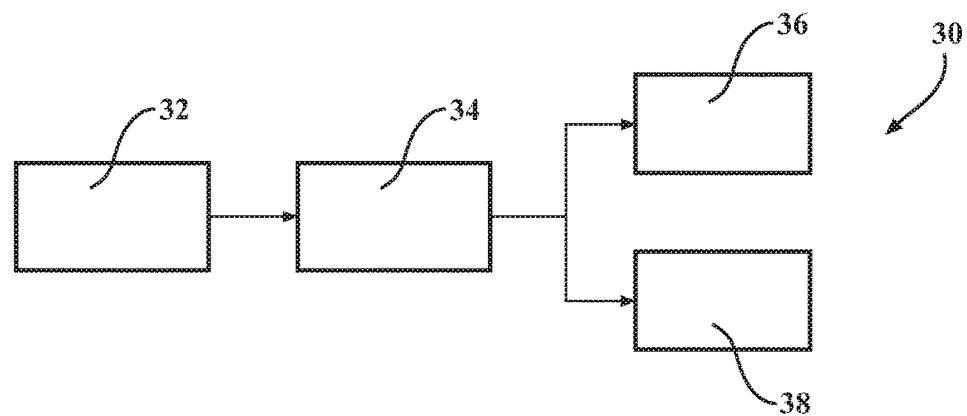
FIG. 2 schematically illustrates an exemplary CNN inference information flow, in accordance with the present disclosure.

FIG. 2 schematically illustrates an exemplary CNN inference information flow 30. Once the error prediction head network 22 is trained, it may be combined with the trained tiles prediction deep network 14 to form a trained lane and uncertainty network 34 for operational use in inference of lane geometries. In one embodiment, the error prediction head network 22 is a small network that works on top of the trained tiles prediction deep network 14. The error prediction head network 22 is trained after the trained tiles prediction deep network 14 because the uncertainty relies on the detected lanes. The CNN inference information flow 30 includes sensor 32 operable to gather images related to a road surface. Information from the sensor 32 is provided to the trained lane and uncertainty network 34. Based upon the training performed in the illustrated process of FIG. 1, the trained lane and uncertainty network 34 may output lane predictions 36 and lane uncertainty predictions 38 based upon input images provided by the sensor 32.

Figure 3A:
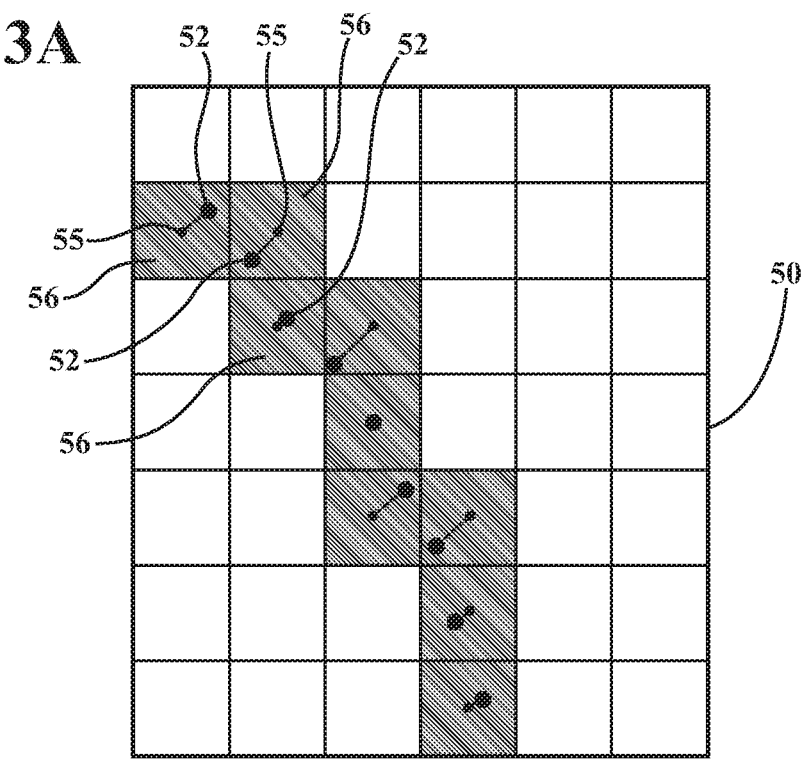
FIG. 3A illustrates graphically an analytical tile matrix which may be utilized to analyze an input image corresponding to a road surface, in accordance with the present disclosure.
Figure 3B:
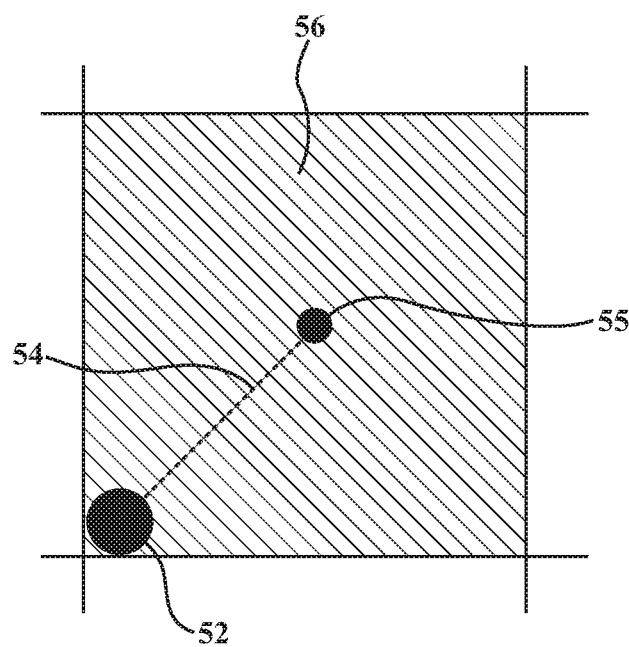
FIG. 3B illustrates graphically one of the occupied tiles of FIG. 3A in greater detail, in accordance with the present disclosure.

FIG. 3A illustrates graphically an analytical tile matrix 50 which may be utilized to analyze an input image corresponding to a road surface. The analytical tile matrix 50 may be transposed to or used in conjunction with an input image of a road surface including lane markings or indications of a lane of travel. A resolution of tiles within analytical tile matrix 50 may vary, and the six by seven matrix illustrated in FIG. 3A is a non-limiting example. A plurality of data points 52 correspond to lane point predictions which the trained lane and uncertainty network 34 of FIG. 2 may infer from the input image through a programmed lane tiles prediction model. A plurality of occupied tiles 56 may be identified within which at least one of the data points 52 is present. A tile center 55 of each occupied tile 56 may be identified. FIG. 3B illustrates graphically one of the occupied tiles 56 of FIG. 3A in greater detail. Occupied tile 56 includes the data point 52 and a tile center 55. Line 54 ties a data point 52 to a corresponding tile center 55.

Figure 4:
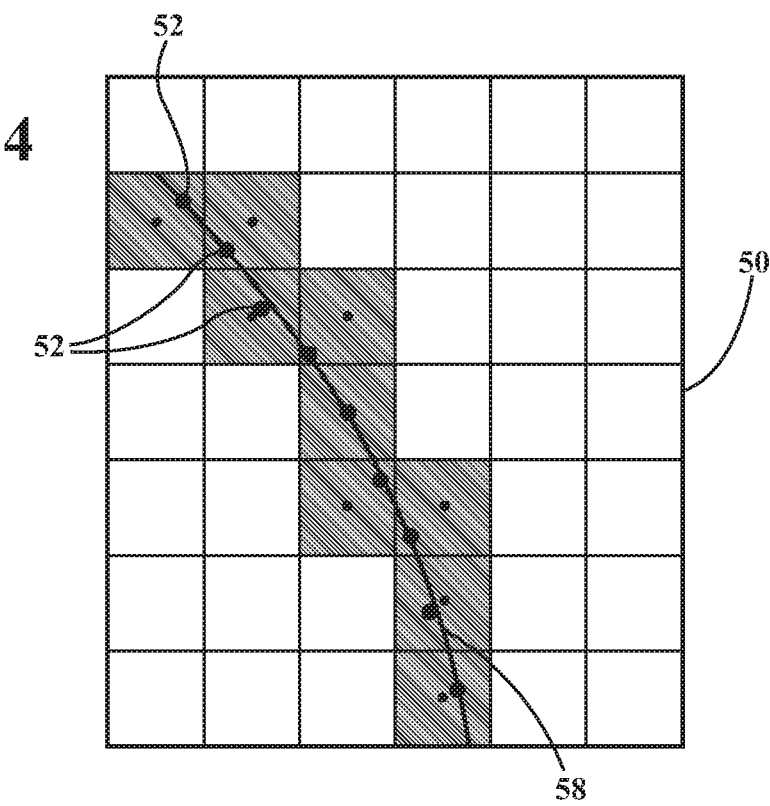
FIG. 4 illustrates graphically utilizing the data points corresponding to lane point predictions to predict an entire predicted lane curve through points clustering, in accordance with the present disclosure.

FIG. 4 illustrates graphically utilizing the data points 52 corresponding to lane point predictions to predict an entire predicted lane curve 58 through points clustering. The entire predicted lane curve 58 may be fitted or approximated to the data points 52.

Figure 5:
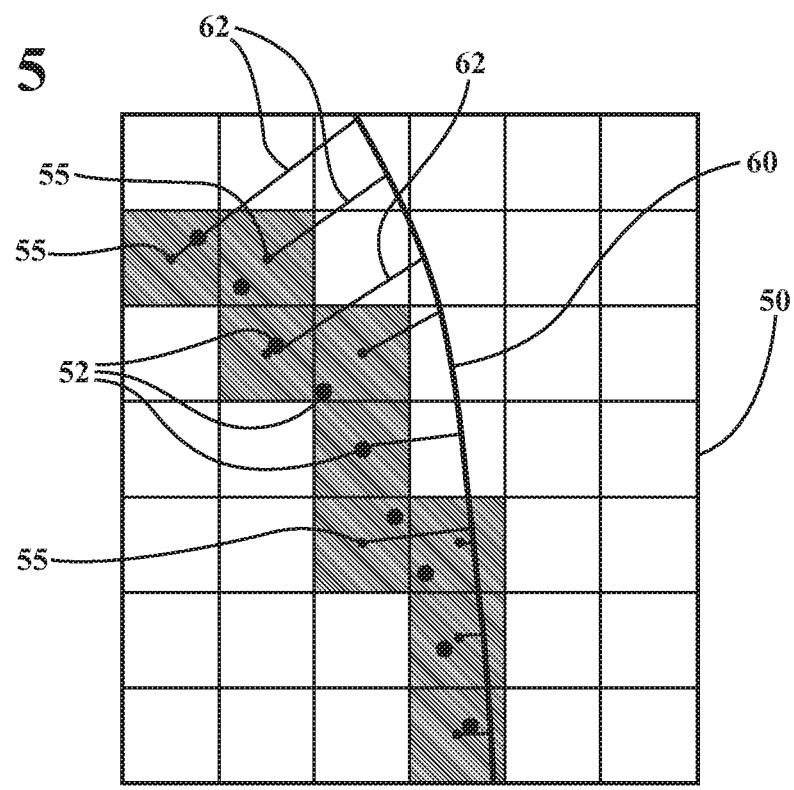
FIG. 5 illustrates graphically utilizing a ground truth lane to determine error in the data points, in accordance with the present disclosure.

A ground truth lane utilized for training purposes includes data representing an actual lane geometry upon a road surface that is the source of the data represented in the data points 52. FIG. 5 illustrates graphically utilizing a ground truth lane 60 to determine error in the data points 52. According to one exemplary embodiment, a process to utilize one or more ground truth lane 60 to determine error in associating a selected one of the ground truth lanes 60 to a selected set of the data points 52 representing a predicted lane and, second, associating points on the selected ground truth lane 60 and the selected set of data points 52. Associating points in this way may be described as a per point association of the predicted lane to the ground truth lane 60.

In one embodiment, points on the selected ground truth lane 60 may be associated with one of the tile centers 55 corresponding to the selected set of data points 52. An algorithm to associate points on the selected ground truth lane 60 may include a preference toward associating points on the selected ground truth lane 60 to a closest of the tile centers 55 while considering conservation of length of both the selected ground truth lane 60 and the predicted lane represented by the data points 52. Considering conservation of length may be described as assuming that progression along each of the ground truth lane 60 and the predicted lane represented by the data points 52 in approximately equal increments per data point may be assumed. Once the points on the selected ground truth lane 60 and the tile centers 55 have been associated, a distance 62 between the points on the selected ground truth lane 60 and the tile centers 55 may be determined and used to determine error in the predicted lane. This error may be used to train the error prediction head network 22 as described in relation to FIG. 1.

Associating predicted lane data points to a ground truth lane may be complicated by a plurality of sets of predicted lane data points and/or a plurality of ground truth lanes being in a single area or in a single input image. By, first, associating a selected one of the ground truth lanes 60 to a selected set of the data points 52 representing a predicted lane and then, second, associating points on the selected ground truth lane 60 and the selected set of data points 52, confusion and inaccurate error determinations may be avoided by ensuring that the correct set of data points 52 is associated with and compared to the correct ground truth lane 60.

Figure 6:
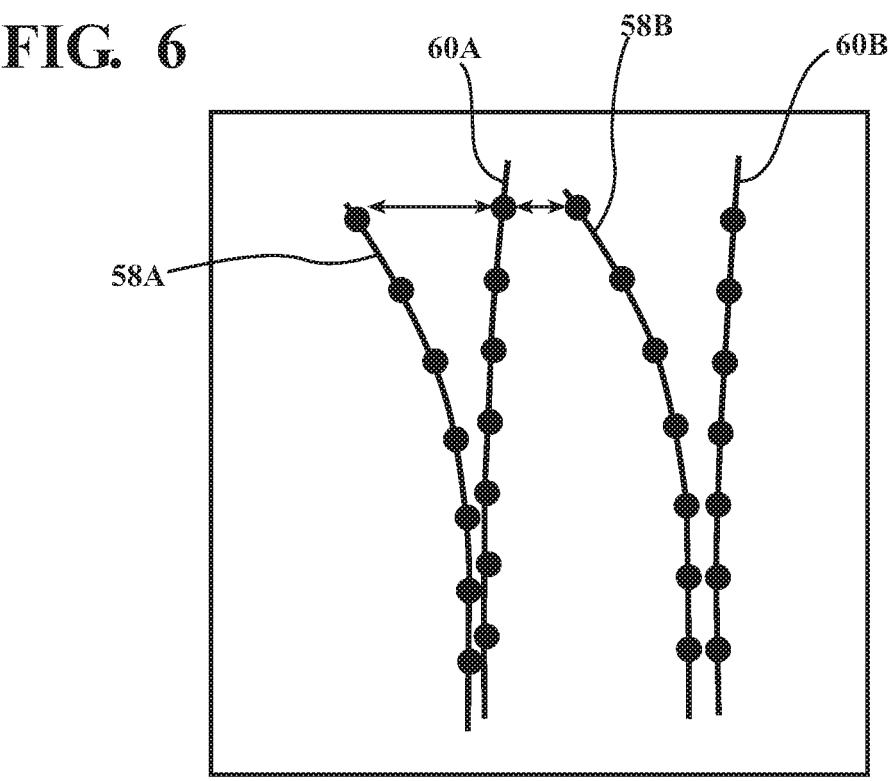
FIG. 6 illustrates graphically a first ground truth lane marking and a second ground truth lane marking in comparison to a first entire predicted lane curve and a second entire predicted lane curve, in accordance with the present disclosure.

FIG. 6 illustrates graphically a first ground truth lane marking 60A and a second ground truth lane marking 60B in comparison to a first entire predicted lane curve 58A and a second entire predicted lane curve 58B. The first entire predicted lane curve 58A and the second entire predicted lane curve 58B may each include and be fitted to a plurality of data points generated by analyzing an input image. The first ground truth lane marking 60A and the second ground truth lane marking 60B are each sets of data associated with a predetermined lane marking geometry corresponding to lanes represented in the input image used to create the first entire predicted lane curve 58A and the second entire predicted lane curve 58B. The first entire predicted lane curve 58A includes predicted data point generated based upon a portion of the input image representing or corresponding to the first ground truth lane marking 60A. The second entire predicted lane curve 58B includes predicted data point generated based upon a portion of the input image representing or corresponding to the second ground truth lane marking 60B. The first entire predicted lane curve 58A, the second entire predicted lane curve 58B, the first ground truth lane marking 60A, and the second ground truth lane marking 60B exist in a common space. Near a top vertical portion of the graph, error between the plots creates a condition where the second entire predicted lane curve 58B is closer to the first ground truth lane marking 60A than the first entire predicted lane curve 58A is to the first ground truth lane marking 60A. If association of a point in that top portion of the first ground truth lane marking 60A were performed based solely upon which predicted data point were closest to the point on the first ground truth lane marking 60A, an in accurate association would occur between the second entire predicted lane curve 58B is closer to the first ground truth lane marking 60A. By first associating a selected one of the ground truth lanes to an entire predicted lane curve, inaccurate association of the ground truth lane to a wrong entire predicted lane curve may be avoided.

Figure 7:
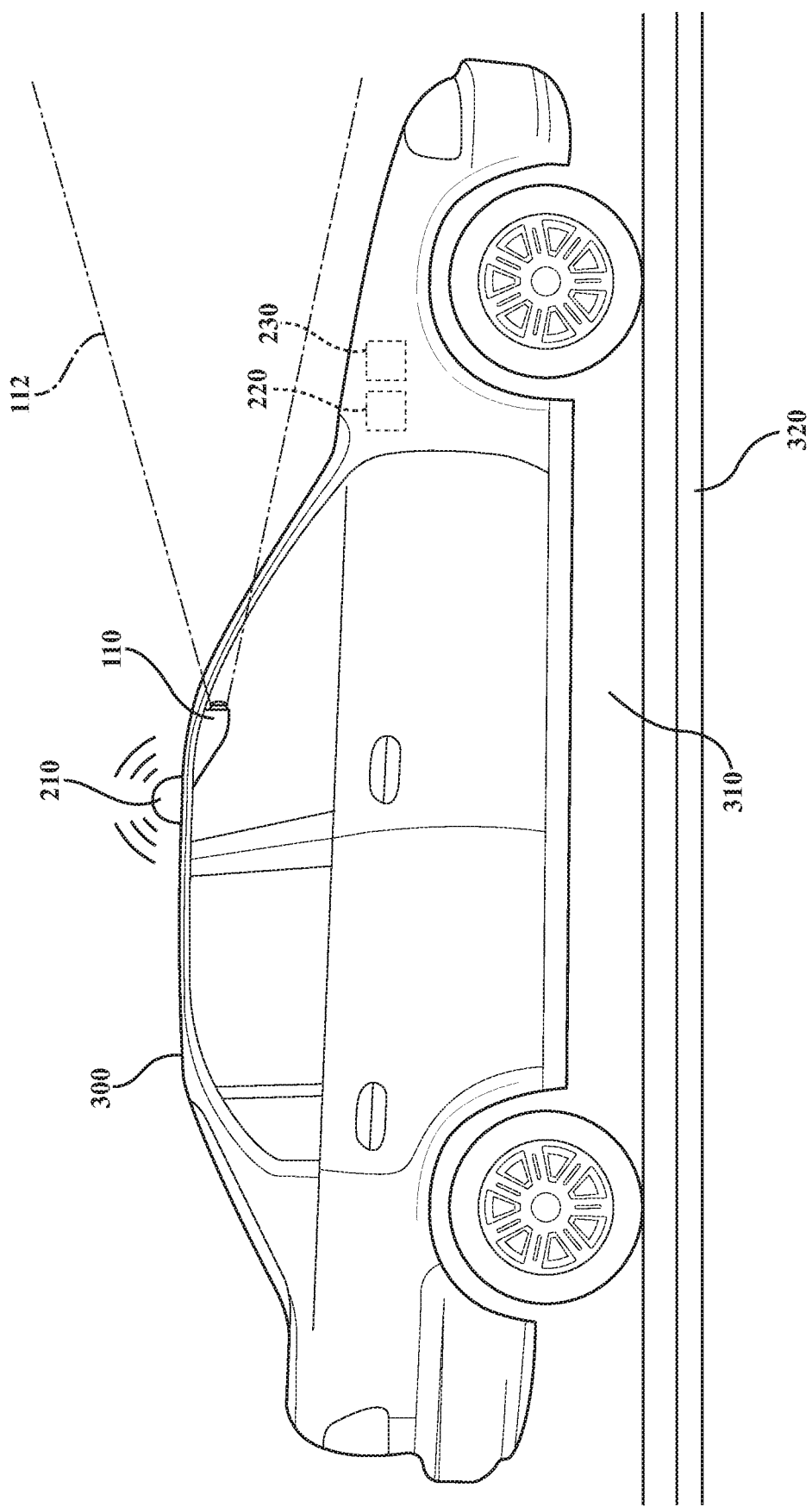
FIG. 7 illustrates an exemplary vehicle being controlled by the disclosed process and system, including devices and modules useful to collecting input images and processing the input images, in accordance with the present disclosure.

FIG. 7 illustrates an exemplary vehicle being controlled by the disclosed process and system, including devices and modules useful to collecting input images and processing the input images as described herein. A host vehicle 300 is illustrated upon road surface 310 including lane markings 320. The host vehicle 300 is illustrated including navigation controller 220, vehicle controller 230, camera device 110, and sensor device 210. The camera device 110 includes a field of view 112 and is positioned to capture images of the road surface 310 and other objects and obstacles near the host vehicle 300, including input images representing the road surface 310. The sensor device 210 may additionally provide data regarding objects near the host vehicle 300. The navigation controller 220 receives data from the camera device 110 and other sources and may generate a commanded navigation plot based upon analysis of available data. The vehicle controller 230 utilizes the commanded navigation plot to control navigation of the host vehicle 300 upon the road surface 310. Control of the host vehicle 300 may include control of steering, powertrain output torque, and/or braking; may include autonomous or semi-autonomous navigation of the vehicle according to a planned navigation route over a digital map or through a detected environment; and/or may include providing warnings and instructions to a driver regarding navigation, lane location, object avoidance, and other relevant driving issues.

The navigation controller 220 may perform image recognition upon input images generated by the camera device 110. The navigation controller 220 may include a CNN trained in accordance with the disclosed process, such that the CNN provides the navigation controller with lane predictions and lane uncertainty predictions based upon input images provided by the camera device 110. The lane uncertainty predictions may be utilized by algorithms programmed into the navigation controller 220 to assign a weight or quality rating to the lane predictions, such that predicted uncertainty and likely error in the lane predictions may be taken into account in the commanded navigation plot generated by the navigation controller 220.

Host vehicle 300 is provided as an exemplary vehicle utilizing the disclosed process and system. Other embodiments are envisioned, and the disclosure is not intended to be limited to the examples provided herein.

Figure 8:
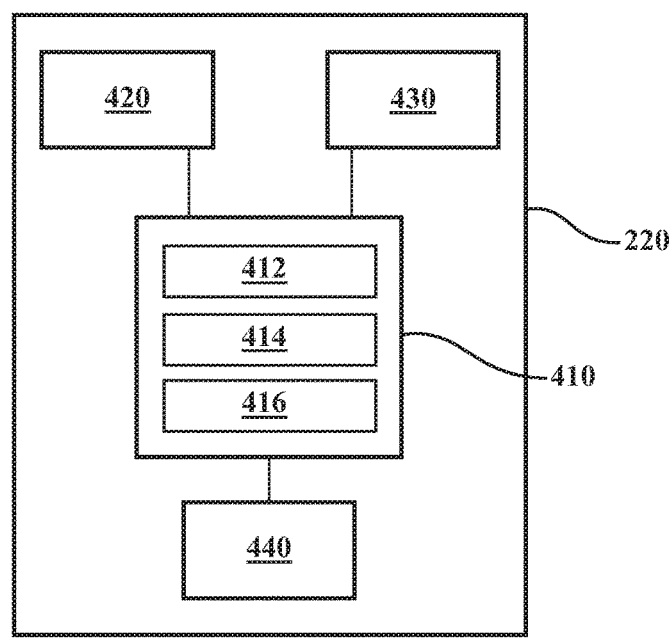
FIG. 8 schematically illustrates an exemplary computerized navigation controller, in accordance with the present disclosure.

Various controllers may be utilized within the disclosed system to operate the disclosed process. Controllers may include a computerized device including a computerized processor including memory capable of storing programmed executable code. A controller may be operated upon a single computerized device or may span several computerized devices. FIG. 8 schematically illustrates an exemplary computerized navigation controller. Navigation controller 220 includes computerized processor device 410, communications module 430, data input/output module 420, and memory storage device 440. It is noted that navigation controller 220 may include other components and some of the components are not present in some embodiments.

The processor device 410 may include memory, e.g., read only memory (ROM) and random-access memory (RAM), storing processor-executable instructions and one or more processors that execute the processor-executable instructions. In embodiments where the processor device 410 includes two or more processors, the processors may operate in a parallel or distributed manner. Processor device 410 may execute the operating system of the navigation controller 220. Processor device 410 may include one or more modules executing programmed code or computerized processes or methods including executable steps. Illustrated modules may include a single physical device or functionality spanning multiple physical devices. In the illustrative embodiment, the processor device 410 also includes trained lane and uncertainty network 412, commanded navigation plot generator 414, and high uncertainty reaction module 416, which are described in greater detail below.

The data input/output module 420 is a device that is operable to take data gathered from sensors and devices throughout the vehicle and process the data into formats readily usable by processor device 410. Data input/output module 420 is further operable to process output from processor device 410 and enable use of that output by other devices or controllers throughout the vehicle.

The communications module 430 may include a communications/data connection with a bus device configured to transfer data to different components of the system and may include one or more wireless transceivers for performing wireless communication.

The memory storage device 440 is a device that stores data generated or received by the navigation controller 220. The memory storage device 440 may include, but is not limited to, a hard disc drive, an optical disc drive, and/or a flash memory drive.

The trained lane and uncertainty network 412 may be a CNN programmed to operate the process described herein including training, weights, and biases operable to enable trained lane and uncertainty network 412 to analyze input images and generate a lane prediction and a lane uncertainty prediction.

The commanded navigation plot generator 414 may include programming to utilize available data, including the lane prediction and lane uncertainty prediction generated by the trained lane and uncertainty network 412 to generate a commanded navigation plot to aid or control navigation of the host vehicle. In some embodiments, for example in a semi-autonomous vehicle or a host vehicle equipped with warning systems, commanded navigation plot generator 414 may alternatively be described as a recommended navigation plot generator.

The high uncertainty reaction module 416 may include programming to react to a lane uncertainty prediction by the trained lane and uncertainty network 412 indicating that the lane prediction generated by the trained lane and uncertainty network 412 may temporarily be of low quality or unreliable. The high uncertainty reaction module 416 may include programming to command a visual or audio warning, may include programming to employ autonomous braking, may include programming to increase a minimum distance between the host vehicle and other nearby vehicles, and/or other similar reactive measures.

Navigation controller 220 is provided as an exemplary computerized device capable of executing programmed code to evaluate and selectively utilize input images to generate and utilize a lane prediction and a lane uncertainty prediction. Several different embodiments of navigation controller 220, devices attached thereto, and modules operable therein are envisioned, and the disclosure is not intended to be limited to examples provided herein.

Figure 9:
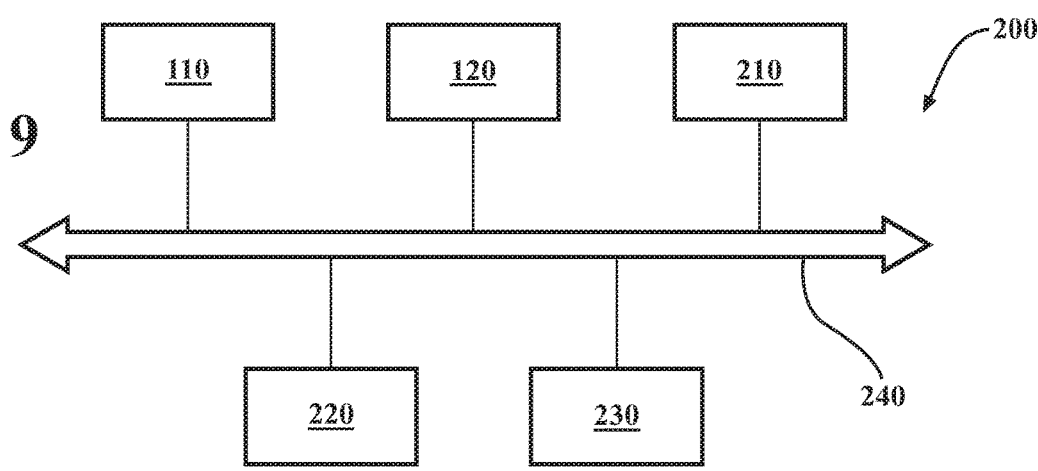
FIG. 9 schematically illustrates an exemplary data communication system within a vehicle being controlled, in accordance with the present disclosure.

FIG. 9 schematically illustrates an exemplary data communication system 200 within a host vehicle. The data communication system 200 is illustrated including a camera device 110, a digital map database 120, a sensor device 210, a navigational controller 220, and a vehicle controller 230, each respectively communicatively connected to vehicle data bus 240. The sensor device 210 may include one or more of a radar device, LiDAR device, ultrasonic device, or other similar device useful for gathering data about the environment of a vehicle and behavior of other vehicles upon a roadway. The vehicle data bus 240 includes a communication network capable of transferring data quickly back and forth between various connected devices and modules. Data may be collected from each of the camera device 110, the digital map database 120, and the sensor device 210 and transferred to the navigational controller 220. The navigational controller 220 includes a computerized processor and programmed code operable to create a commanded navigation plot useful to navigate the vehicle being controlled over a road surface proximate to the vehicle.

Navigation plots described herein may be useful to command navigation of a fully autonomous vehicle. Similarly, navigation plots described herein may be useful to command navigation of a semi-autonomous vehicle, for example, to provide automated braking, lane-tending, or obstacle avoidance. Similarly, navigation plots described herein may be useful to provide navigational aids such as projected graphics or generated sounds to aid a driver in efficiently controlling a vehicle. Examples are provided herein of how generated navigation plots may be utilized. Other embodiments are envisioned, and the disclosure is not intended to be limited to the examples provided herein.

The disclosed process and system describe an improvement of feature availability for autonomous and semi-autonomous vehicles. In conditions where some navigation processes would lack sufficient data and guidance to effectively navigate the vehicle, for example, in a construction zone with missing, contradictory, or displaced lane markings, the disclosed process and system may be used to validate and successfully utilize images of an area in front of the host vehicle to navigate the vehicle through the exemplary construction zone.

While the best modes for carrying out the disclosure have been described in detail, those familiar with the art to which this disclosure relates will recognize various alternative designs and embodiments for practicing the disclosure within the scope of the appended claims.

What is claimed is:

1. A system for end to end prediction of lane detection uncertainty, comprising:
   a sensor device for a host vehicle operable upon a road surface within a driving environment including lane markings, wherein the sensor device is operational to generate data related to the road surface within the driving environment;
   a navigation controller including a computerized processor operable to:
   monitor the data including an input image from the sensor device;
   utilize a convolutional neural network to analyze the input image and output a lane prediction and a lane uncertainty prediction; and
   generate a commanded navigation plot based upon the lane prediction and the lane uncertainty prediction; and
   a vehicle controller operable to control the host vehicle based upon the commanded navigation plot;

wherein the convolutional neural network is initially trained using a per point association and error calculation, the per point association and error calculation including:
  first, associating a selected ground truth lane to a selected set of data points related to a predicted lane, and
  second, associating at least one point of the selected ground truth lane to a corresponding data point from the selected set of data points related to the predicted lane.

2. The system of claim 1, wherein the convolutional neural network includes:
  a trained tiles prediction deep network operable to perform image recognition upon the input image; and
  an error prediction head network operable to be trained using the per point association and error calculation.

3. The system of claim 2, wherein utilizing the convolutional neural network includes utilizing a trained lane and uncertainty network, wherein the trained lane and uncertainty network includes a combination of the trained tiles prediction deep network and the error prediction head network.

4. The system of claim 1, wherein the per point association and error calculation further includes determining an error related to the at least one point of the selected ground truth lane and the corresponding data point from the selected set of data points related to the predicted lane.

5. The system of claim 4, wherein the convolutional neural network utilizes a tile matrix to analyze the input image;
  wherein the per point association and error calculation further includes:
    identifying a corresponding tile of the tile matrix for each point of the selected set of data points related to predicted lane; and
    identifying a tile center for each of the identified tiles; and
  wherein determining the error related to the at least one point of the selected ground truth lane and the corresponding data point from the selected set of data points related to the predicted lane includes determining a difference between the at least one point of the selected ground truth lane and a selected one of the tile centers.

6. The system of claim 5, wherein determining the difference between the at least one point of the selected ground truth lane and the selected one of the tile centers includes identifying the selected one of the tile centers from the tile centers based upon distances of each of the tile centers to the at least one point of the selected ground truth lane.

7. The system of claim 6, wherein the identifying the selected one of the tile centers from the tile centers is further based upon incrementally progressing along the selected ground truth lane and the predicted lane.

8. The system of claim 1, wherein the computerized processor is further operable to selectively localize the host vehicle in relation to a digital map based upon the lane uncertainty prediction.

9. The system of claim 1, wherein the sensor device includes a camera device.

10. The system of claim 1, wherein the sensor device includes a LiDAR device.

11. A system for end to end prediction of lane detection uncertainty within a host vehicle, comprising:
  the host vehicle, including:
    a sensor device for a host vehicle operable upon a road surface within a driving environment including lane markings, wherein the sensor device is operational to generate data related to the road surface within the driving environment, wherein the sensor device includes one of a camera device or a LiDAR device;
    a navigation controller including a computerized processor operable to:
      monitor the data including an input image from the sensor device;
      utilize a convolutional neural network to analyze the input image and output a lane prediction and a lane uncertainty prediction, wherein the convolutional neural network includes:
        a trained tiles prediction deep network performing image recognition upon the input image; and
        an error prediction head network initially trained using a per point association and error calculation, the per point association and error calculation including:
          first, associating a selected ground truth lane to a selected set of data points related to a predicted lane, and
          second, associating at least one point of the selected ground truth lane to a corresponding data point from the selected set of data points related to the predicted lane; and
      generate a commanded navigation plot based upon the lane prediction and the lane uncertainty prediction; and
    a vehicle controller operable to control the host vehicle based upon the commanded navigation plot.

12. The system of claim 11, wherein utilizing the convolutional neural network includes utilizing a trained lane and uncertainty network, wherein the trained lane and uncertainty network includes a combination of the trained tiles prediction deep network and the error prediction head network.

13. The system of claim 11, wherein the per point association and error calculation further includes determining an error related to the at least one point of the selected ground truth lane and the corresponding data point from the selected set of data points related to the predicted lane.

14. The system of claim 13, wherein the convolutional neural network utilizes a tile matrix to analyze the input image;
  wherein the per point association and error calculation further includes:
    identifying a corresponding tile of the tile matrix for each point of the selected set of data points related to predicted lane; and
    identifying a tile center for each of the identified tiles; and
  wherein determining the error related to the at least one point of the selected ground truth lane and the corresponding data point from the selected set of data points related to the predicted lane includes determining a difference between the at least one point of the selected ground truth lane and a selected one of the tile centers.

15. A process for end to end prediction of lane detection uncertainty, comprising:
  within a computerized processor:
    initially training a convolutional neural network using a per point association and error calculation, the per point association and error calculation including:
      first, associating a selected ground truth lane to a selected set of data points related to a predicted lane; and second, associating at least one point of the selected ground truth lane to a corresponding data point from the selected set of data points related to the predicted lane;

subsequently utilizing the convolutional network for operational use in inference of lane geometries including:

monitoring data including an input image from a sensor device of a host vehicle generating the data related to a road surface in front of the host vehicle including lane markings;

utilizing the convolutional neural network to analyze the input image and output a lane prediction and a lane uncertainty prediction; and generating a commanded navigation plot based upon the lane prediction and the lane uncertainty prediction; and controlling the host vehicle based upon the commanded navigation plot.

16. The process of claim 15, wherein utilizing the convolutional neural network for the operational use in the inference of the lane geometries further includes selectively localizing the host vehicle in relation to a digital map based upon the lane uncertainty prediction.

17. The process of claim 15, wherein using the per point association and error calculation further includes determining an error related to the at least one point of the selected ground truth lane and the corresponding data point from the selected set of data points related to the predicted lane.

18. The process of claim 17, wherein utilizing the convolutional neural network to analyze the input image includes utilizing a tile matrix to analyze the input image;

wherein using the per point association and error calculation further includes:

identifying a corresponding tile of the tile matrix for each point of the selected set of data points related to predicted lane; and identifying a tile center for each of the identified tiles; and wherein determining the error related to the at least one point of the selected ground truth lane and the corresponding data point from the selected set of data points related to the predicted lane includes determining a difference between the at least one point of the selected ground truth lane and a selected one of the tile centers.

19. The process of claim 18, wherein determining the difference between the at least one point of the selected ground truth lane and the selected one of the tile centers includes identifying the selected one of the tile centers from the tile centers based upon distances of each of the tile centers to the at least one point of the selected ground truth lane.

20. The process of claim 19, wherein identifying the selected one of the tile centers from the tile centers is further based upon incrementally progressing along the selected ground truth lane and the predicted lane.

* * * * *